(12) United States Patent
Benshetrit

(10) Patent No.: US 8,371,087 B2
(45) Date of Patent: Feb. 12, 2013

(54) FOLDING SUPPORT OR FRAME STRUCTURE

(75) Inventor: Dror Benshetrit, New York, NY (US)

(73) Assignee: Studio Dror, New York, NY (US)

( * ) Notice: Subject to any disclaimer, the term of this patent is extended or adjusted under 35 U.S.C. 154(b) by 216 days.

(21) Appl. No.: 12/711,421

(22) Filed: Feb. 24, 2010

(65) Prior Publication Data

US 2010/0146888 A1    Jun. 17, 2010

Related U.S. Application Data

(63) Continuation-in-part of application No. 11/845,904, filed on Aug. 28, 2007, now Pat. No. 7,946,544.

(60) Provisional application No. 61/156,242, filed on Feb. 27, 2009, provisional application No. 60/840,621, filed on Aug. 28, 2006.

(51) Int. Cl.
    *E04H 12/18* (2006.01)
(52) U.S. Cl. .......................... 52/646; 52/79.5
(58) Field of Classification Search ............. 52/272, 52/574, 561, 656.5, 655.1, 645, 646; 108/157, 108/159; 248/558, 150, 188, 188.6, 166, 248/440.1, 694
See application file for complete search history.

(56) References Cited

U.S. PATENT DOCUMENTS

| | | | | |
|---|---|---|---|---|
| 1,652,942 | A * | 12/1927 | James | 108/159 |
| 2,247,614 | A | 7/1941 | Lingenfelter | |
| 2,751,635 | A * | 6/1956 | Donnahue | 52/69 |
| 3,025,640 | A | 3/1962 | Muhr | |
| 4,010,579 | A * | 3/1977 | Galvagni | 52/79.8 |
| 4,580,375 | A * | 4/1986 | Nodskov et al. | 52/109 |
| 4,663,899 | A * | 5/1987 | Nodskov et al. | 52/109 |
| 4,723,382 | A * | 2/1988 | Lalvani | 52/81.1 |
| 4,766,711 | A | 8/1988 | Bermingham et al. | |
| 4,970,841 | A * | 11/1990 | Zeigler | 52/646 |
| 5,040,349 | A * | 8/1991 | Onoda et al. | 52/646 |
| 5,123,550 | A * | 6/1992 | Nodskov et al. | 211/189 |
| 5,402,608 | A * | 4/1995 | Chu | 52/79.1 |
| 5,761,871 | A * | 6/1998 | Atake | 52/653.1 |
| 7,941,975 | B2 * | 5/2011 | Ingjaldsdottir et al. | 52/79.12 |
| 7,946,544 | B2 * | 5/2011 | Benshetrit | 248/188.6 |
| 2008/0048089 | A1 | 2/2008 | Benshetrit | |
| 2008/0276553 | A1 * | 11/2008 | Ingjaldsdottir et al. | 52/184 |

* cited by examiner

*Primary Examiner* — William Gilbert
*Assistant Examiner* — Gisele Ford
(74) *Attorney, Agent, or Firm* — Gottlieb, Rackman & Reisman, P.C.

(57) ABSTRACT

A novel building block is described which is formed of two similar interlocking elements with chamfered surfaces to allow the elements to rest against each other. In one embodiment, the block is used to made structural walls, In another embodiment, a single block with a transparent or translucent pane is provided to form a window. In yet another embodiment, a building is made with at least one floor, one roof and support structures supporting the roof and being formed of the interlocking elements. Each element is made of L-shaped components.

15 Claims, 13 Drawing Sheets

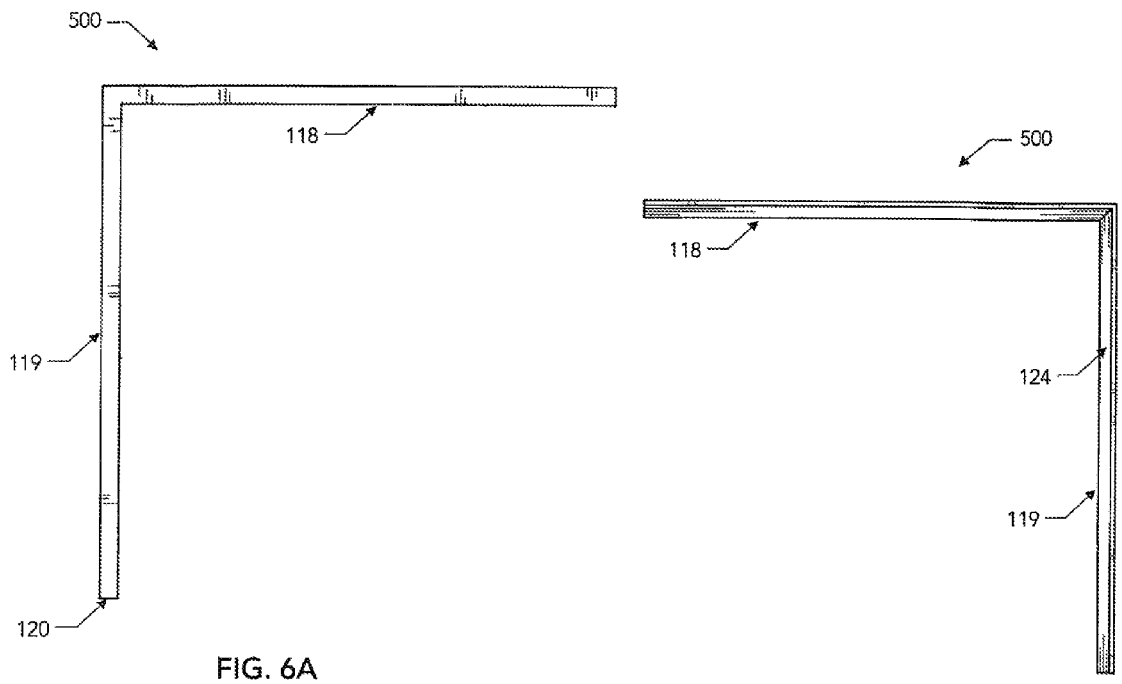
FIG. 6A
FIG. 6B
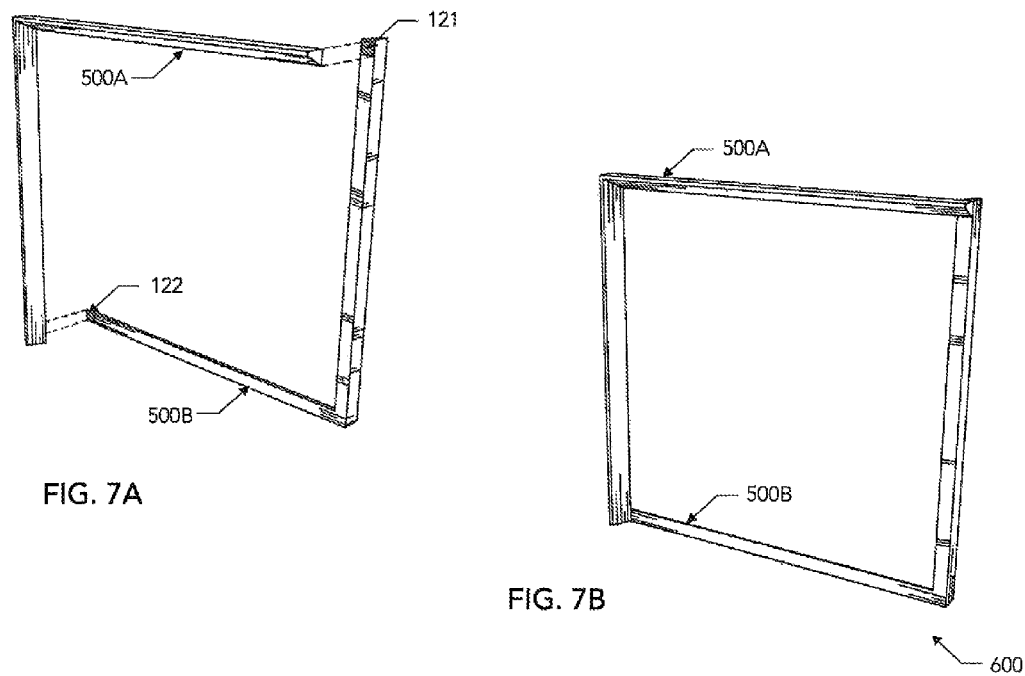
FIG. 7A
FIG. 7B

FOLDING SUPPORT OR FRAME STRUCTURE

RELATED APPLICATIONS

This application claims priority to provisional application Ser. No. 61/156,242 filed Feb. 27, 2009 and is a continuation in part of application Ser. No. 11/845,904 filed Aug. 28, 2007, now U.S. Pat. No. 7,946,544 incorporated herein by reference and claiming priority to provisional application Ser. No. 60/840,621 filed Aug. 28, 2006, all incorporated herein by reference.

BACKGROUND OF THE INVENTION

A. Field of Invention

This invention pertains to a support or frame structure made of at least two identical elements, each element having the shape of a parallelogram, the two elements being joined together in a manner that permits some pivoting of the elements about a diagonal axis.

B. Description of the Prior Art

A basic structural element used for many different purposes is a truss. A typical truss is formed of three linear rigid members, such as bars joined at their ends to form a triangle. Several trusses can be interconnected to form more complex three-dimensional support members. Trusses have been found to be very desirable structural elements because they can withstand large static and dynamic stresses and compressions without damage and are used in many different situations and common every-day objects, starting from relatively small objects such as small picture frames and stands, saw horses, and going all the way to large bridges and building sections.

In some situations support structures are required that can be folded for storage or shipping. For these situations, structures are used that include one or more joints that are either disassembled, or provided with hinges. However, these structures are generally expensive, less reliable, and, often, esthetically unacceptable.

SUMMARY OF THE INVENTION

A basic support structure or frame constructed in accordance with this invention includes two elements, generally having the shape of a parallelogram with two opposed corners defining a diagonal axis. The two elements are interlocked at the two opposed corners in a manner that allows them to pivot with respect to each other around said diagonal axis. Preferably the elements have sides that are chamfered at least at said corners to provide a stop limiting the respective pivoting of the two elements. In this manner the structure is formed without any hinges or the other similar means between the two elements.

In one embodiment, each element is formed of two joined L-shaped components. In one embodiment, the components of the two elements are identical. In one embodiment, the L-shaped structures have width and lengths selected so that the resulting component has substantially no opening or window. This embodiment is particularly suited for applications wherein the components are interlocked to form a structural wall.

The structure is used to make or support various products. For some of these applications, the structures are formed of square or rectangular elements. In other applications the elements have obtuse and acute rather than right angles.

More particularly, in one aspect of the invention, a construction block is presented that includes:

a first and a second element identical to said first element, each of said elements having a generally parallelipipedal shape with a central opening and a cutout at one corner and internal walls formed at least at said central opening, said element being angularly rotated with respect to the other by about 180°, each element having a chamfered internal surface partially defining said internal opening;

each element being interlocked with the other by passing through and essentially covering the central opening of the other, each element having a facing surface directed at the corresponding facing surface of the other element, and said cutouts being positioned along a diagonal axis passing through said elements and through said windows;

wherein said elements pivotable along said diagonal axis between a closed position in which facing surfaces are contacting each other and an open position in which said facing surfaces are separated, with the chamfered internal surfaces of the elements abutting each other and acting as stops to limit the movement of said elements.

Preferably, each element is composed of two identical components, each component having an unsymmetrical L-shape.

Preferably each component has a major component section and a minor component section with the major component of each section being attached to the minor component of the other section. Each component may be formed with six lateral edges, said edges having modular dimensions, with one of the edges being the smallest edge and the other edges having a respective length that is an integral multiple of the other edges. More specifically, if one of said edges has a length x, three of the edges have a length 2x, one edge has a length 3x and one edge has a length 4x.

Preferably the chamfered surface is formed at an angle in the range of 75° to 90°.

In one aspect of the invention, an architectural wall is formed of a plurality of construction blocks, each block being constructed as set forth above, wherein adjacent construction blocks are rotated by an angle of 180° with respect to each other. Several rows of stacked blocks may be used with optional reinforcing members Interconnecting opposed corners formed by said blocks. The reinforcing members include two end plates sized and shaped to cover the corners of four of said blocks and a rod attached between said plates.

In another aspect of the invention, a window assembly for a building is presented with a first and a second element, each of said elements having a generally parallelipipedal shape with a large paralellipedal central opening, said first element having internal surfaces chamfered at a first angle, and said second element having external surfaces chamfered at said first angle, said element being angularly rotated with respect to the other by about 180°;

each element being interlocked at two opposite corners disposed along a diagonal axis;

wherein said elements pivotable along said diagonal axis between a closed position in which said components have parallel surfaces an open position in which the chamfered internal surfaces of the elements abutting each other and acting as stops to limit the movement of said elements.

In one embodiment, said elements are rectangular. In another embodiment, the elements are square. Preferably, the elements have inner surfaces chamfered at an angle in the range of 10° to 80°. One of the elements includes a pane made of a transparent or translucent material covering said large central opening. Preferably, each element has two L-shaped component, said components are interlocked at the corners.

In another aspect of the invention, an architectural structure is presented that includes:
a floor member;
a roof member disposed on top of said floor member; and
a plurality of support structures supporting said roof member on said floor member, each said support structure including:
a first and a second element, each of said elements having a generally parallelipipedal shape with a large parallelipedal central opening, said first element having internal surfaces chamfered at a first angle, and said second element having external surfaces chamfered at said first angle, said element being angularly rotated with respect to the other by about 180°;
each element being interlocked at two opposite corners disposed along a diagonal axis;
wherein said elements pivotable along said diagonal axis between a closed position in which said components have parallel surfaces an open position in which the chamfered internal surfaces of the elements abutting each other and acting as stops to limit the movement of said elements.

Preferably, each support structure is formed with horizontal segments and said floor and roof members have grooves receiving said horizontal segments.

In another embodiment, the support structures preferably have horizontal segments and at least said floor member is formed cutouts receiving said horizontal segments and inserts disposed in said cutouts and arranged to trap said horizontal segments.

In one embodiment, the architectural structure has several levels and intermediate members having a lower surface acting as a roof for a previous floor member and a top surface acting as a floor for the next member.

BRIEF DESCRIPTION OF THE DRAWINGS

FIG. 2C shows a front view of the first element of FIGS. 2A and 2B

FIGS. 6A and 6B show a front and back view of an outside component of a window constructed in accordance with this invention;

FIGS. 7A and 7B show two components like the ones shown in FIGS. 6A and 6B being joined to make a first element;

FIG. 11A shows the assembly of the first level;

FIG. 11B shows the floor of the second level being installed on the first level;

FIG. 11C shows the addition of the roof on the top level;

FIG. 11D shows an isometric view of the completed architectural structure;

DETAILED DESCRIPTION OF INVENTION

Figure 1A:
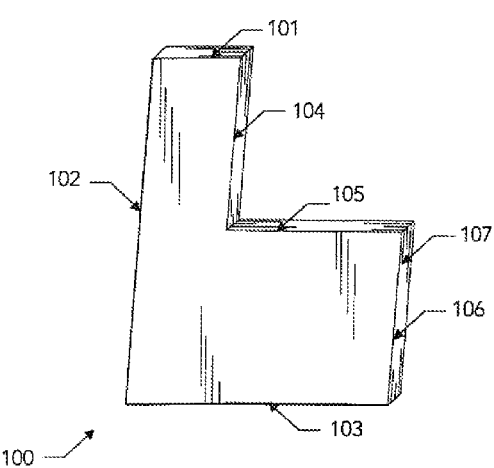
FIGS. 1A and 1B show respective front and back i views of a component for a stackable building block constructed in accordance with this invention.
Figure 1B:
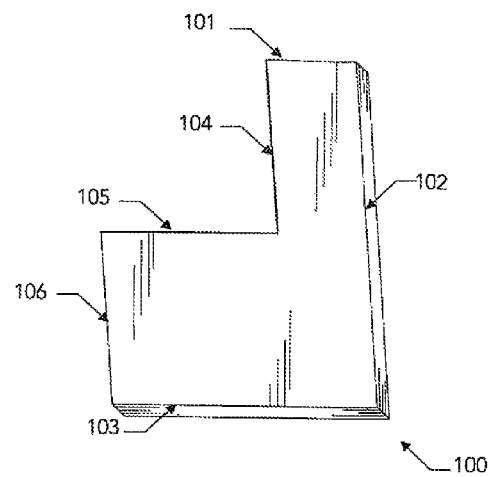

In accordance with the present invention, a first embodiment of the invention, four identical components are used to form an interlocking stackable building block. FIGS. 1A and 1B show the front and back of such a basic component 100. The component 100 is generally L shaped with six modular edges. More specifically, if edge 101 has a dimension 101=x then the remaining edges have the following proportional dimensions: 102=4x, 103=3x, 104=2x, 105=2x, and 106=2x. In the components shown in FIGS. 1A and 1B the angle between edges is either acute or obtuse, however, these angles may vary depending on aesthetic and application desired. Each edge is cut with an identical chamfer shown at 107. This chamfer can range from 10-80 degrees depending on different sizes and applications as discussed below. In a preferred embodiment the angle between the two edges 104 and 105 is preferably in the range of 75°-90°. Typically, for a chamfer angle of approximately 16°, an angle of approximately 86° is required for the unit to sit plumb with the surface on which it rests in the open position.

Figure 2A:
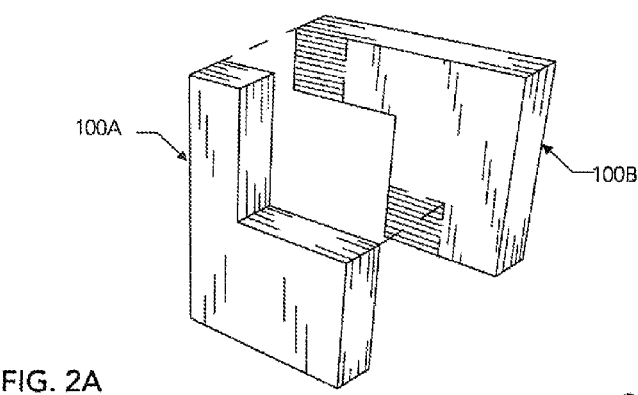
FIGS. 2A and 2B 2C show isometric views of two components like the one shown in FIGS. 1A and 1B being joined to make a first element.
Figure 2B:
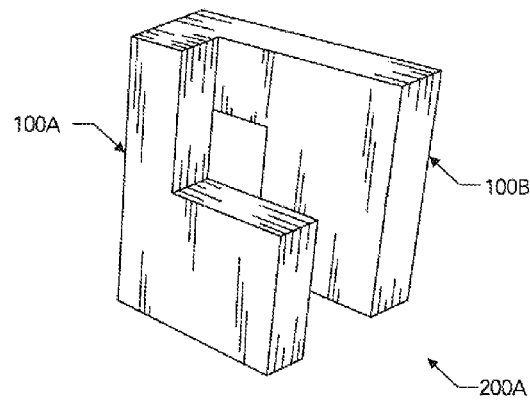
Figure 2C:
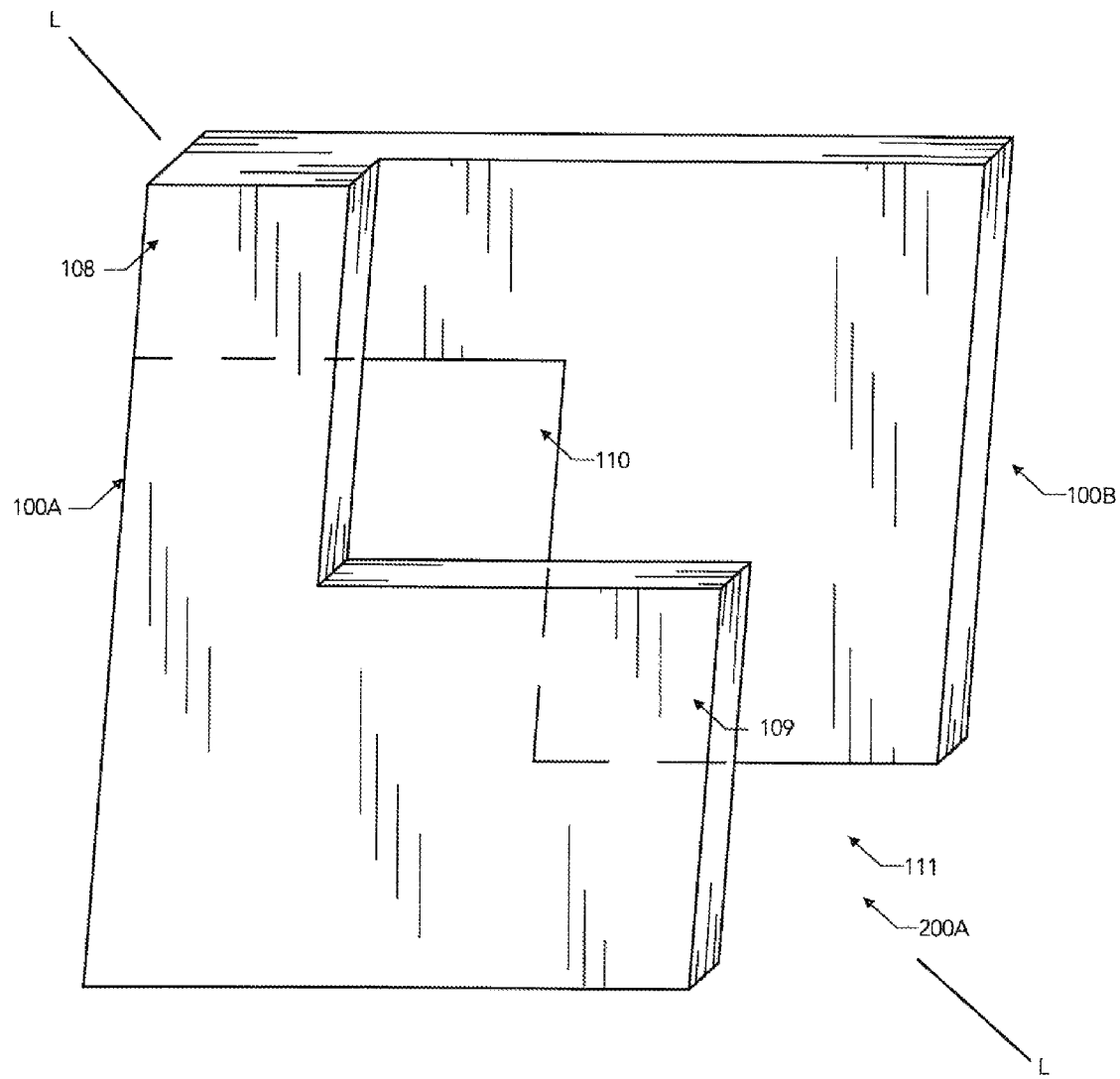

Referring to FIGS. 2A-2C, two components 100A and 100B are joined to form a first element 200A as follows: starting with FIG. 2A, first component 100A is positioned as shown, and the second component 100B is rotated in a position that is offset by 180 degrees from component 100A. The components 100A and 100B can be joined by any well known means. For example, an adhesive, screws, nails or welded connection can be applied between them. All the components have the same thickness.

The resulting element 200A is shown in a front view in FIG. 2C. The two component 100A and 100B overlap at two diagonally opposite corners, 108 and 109. The components are joined together by overlapping zones 108 and 109 leaving open areas at 110 and 111. The open area at 110 has a size identical to that of the overlap at 109, and the open area at 111 has a size identical to that of the overlap at 108. These features are disposed symmetrically about a diagonal axis L-L.

Figure 3A:
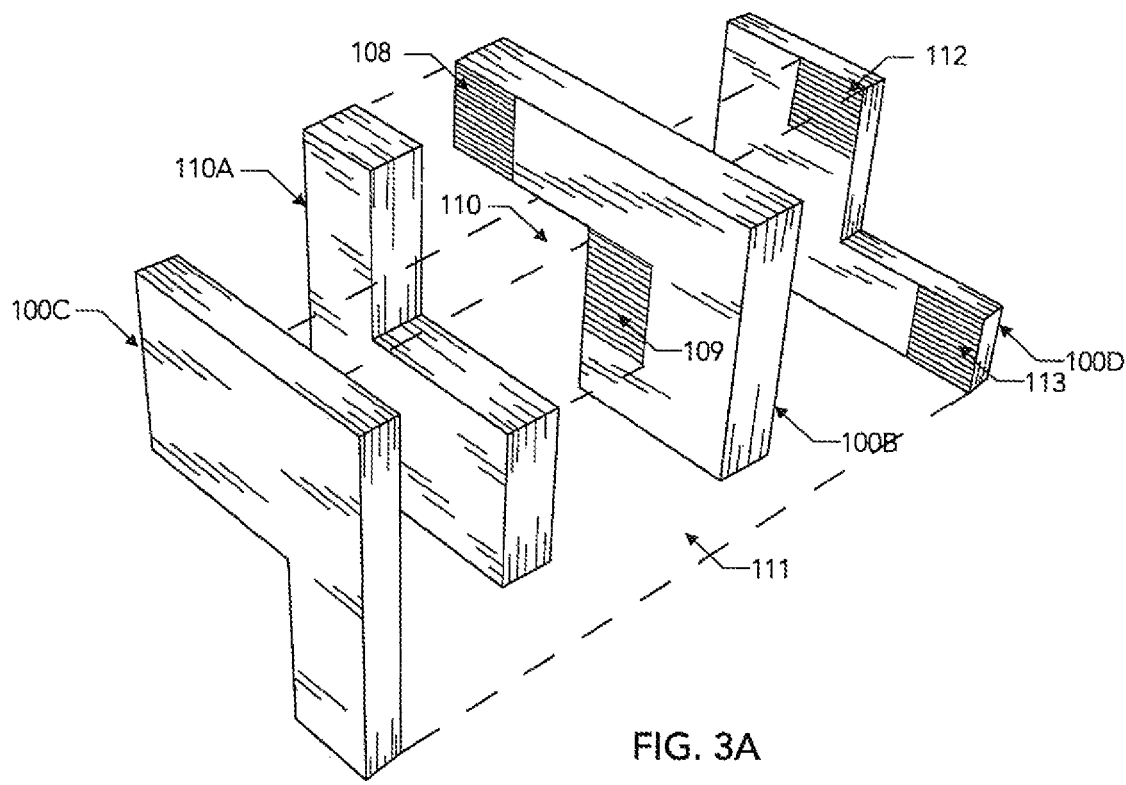
FIGS. 3A and 3B show how four components of FIGS. 1A, 1B are joined to form two interlocking elements, each element being similar to the one shown in FIGS. 2A-2C, to make a basic folding building block.
Figure 3B:
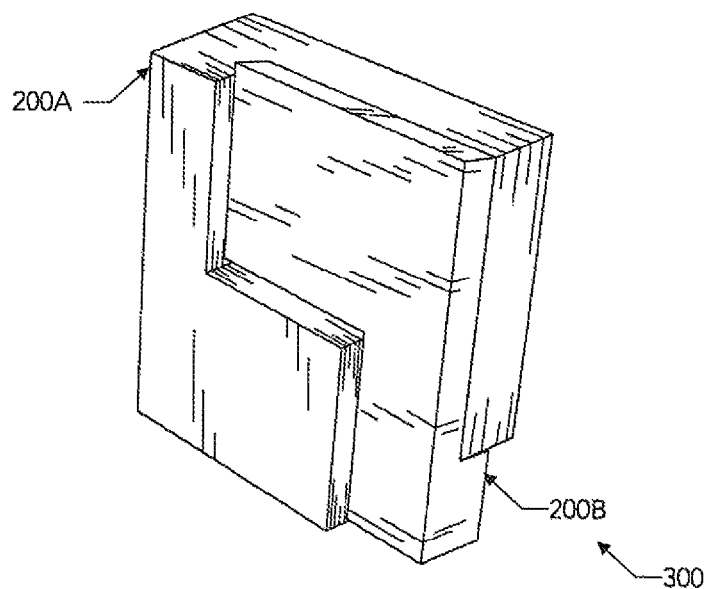
Figure 3C:
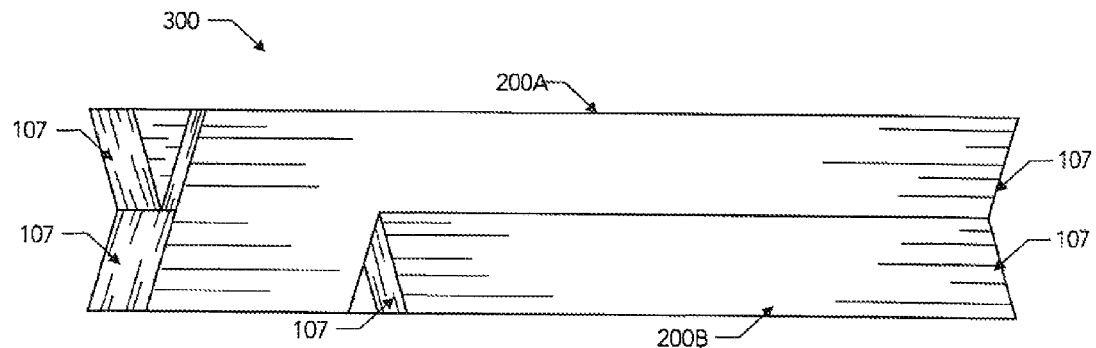
FIG. 3C shows a side view of the building block.

Referring now to FIGS. 3A and 3B, four components 100A-100D are joined two by two to form two elements 200A and 200B. The second element 200B is assembled from its components 100C and 100D so that it is interlocked with element 200A and together form a building block 300. More specifically, component 100C and 100D are rotated and combined so that its overlapping regions 112 and 113 are positioned within the open regions of 200A at 110 and 111, where 112 is combined through 110 and 113 is combined through 111. Thus, it should be apparent that the second element 200B is rotated by 180 degrees with respect to element 200A. It should further be apparent that the two elements 200A and 200B are interlocked because the overlapping regions of one are disposed within the open regions of the other, and vice versa. It should be appreciated that, since all the components have the same thickness, the overall thickness of the structure 300 is equal to double the thickness of the components 100A, 100B, 100C, and 100D as shown in FIGS. 3B and 3C.

Figure 3D:
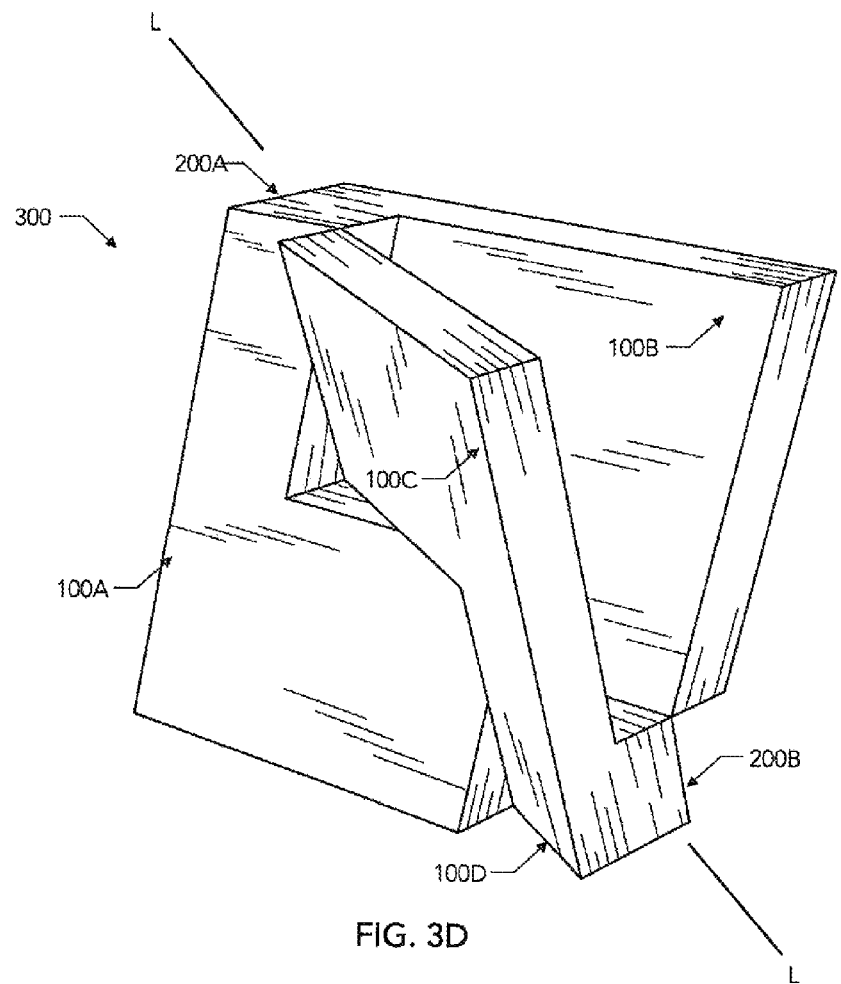
FIG. 3D shows an isometric view of the block formed in FIGS. 3A and 3B, with the two elements 200A, 200B being rotated about the axis L-L.

Since the elements are not mechanically fixed to each other, they can pivot with respect to each other along diagonal axis L-L as shown in FIG. 3D. Importantly, the movement of the elements is limited by the chamfered surfaces 107 shown in FIG. 3C. In other words, the two elements 200A and 200B can be pivoted from the closed configuration shown in FIGS. 3B and 3C toward the open configuration shown in FIG. 3D until the chamfered surfaces 107 come into contact with or abut each other. Referring to FIG. 3C, it should be noted that the chamfer 107 is identical on all edges, and can vary depending sizes and applications of the building block. More specifically, the larger the chamfer cut into each edge, the greater the angle of opening which is possible between each component, as evident in FIG. 3D. These chamfered surfaces 107 act as stops and will resist any additional forces to pivot elements 200A and 200B further. In this manner, structure 300 in the open configuration is a free standing structure that can rest on a surface on its own and can be used to support additional weight, as discussed in detail below without being distorted. If the angle of chamfer 107 is 16° then the maximum angle of rotation between the two elements 200A, 200B is 31°.

As discussed above, in one embodiment of the invention, the elements 200A and 200B are each made of two L-shaped components 100, it should be understood that they may be made of a single component as well, using standard techniques dependant on the material of the component. For example, the elements are best made from two components if they are made of paper, wood, or cardboard. If the elements are made of metal, plastic, concrete, etc., they can be made from a single component, by casting, molding, etc.

Figure 4A:
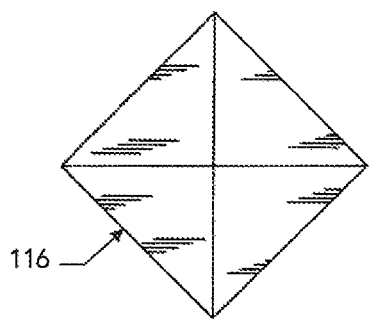
FIGS. 4A, 4B, 4C and 4D show a front, back, side and isometric view of a strut used to connect multiple building blocks described above together in a stacked configuration.
Figure 4B:
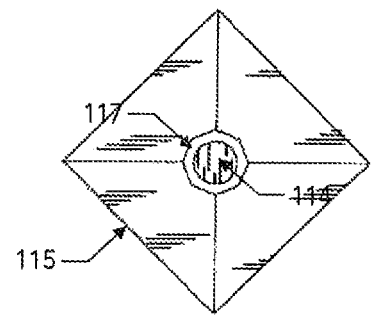
Figure 4C:
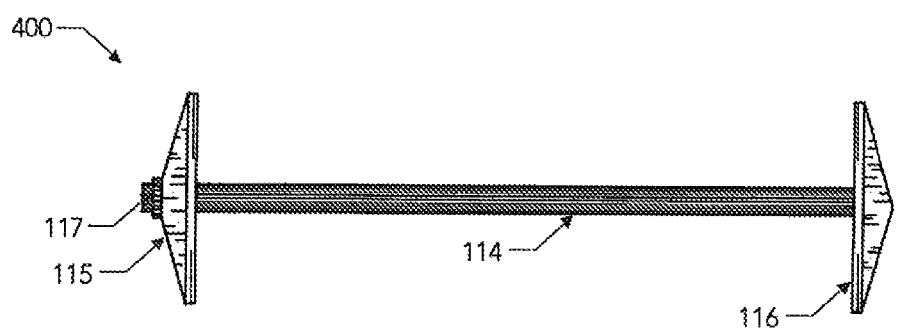
Figure 4D:
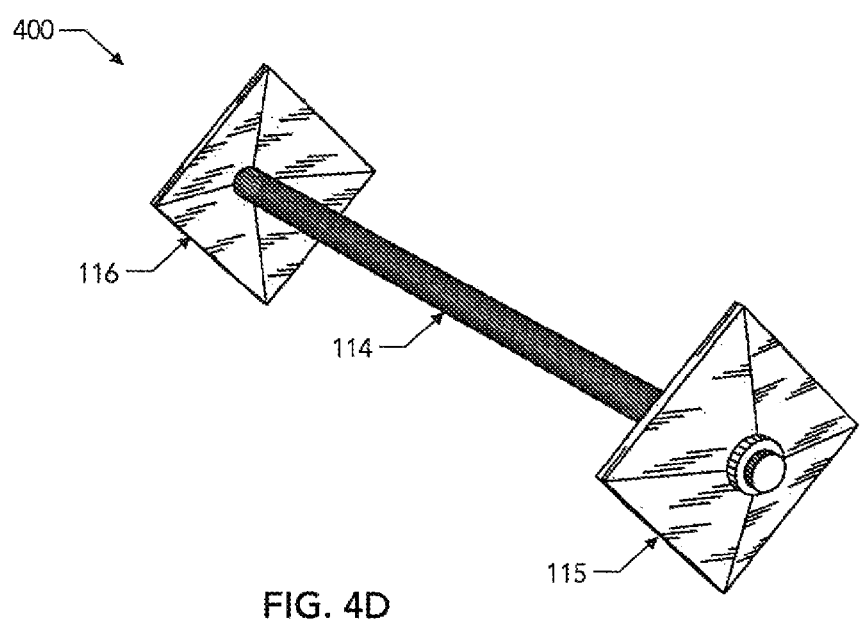
Figure 5A:
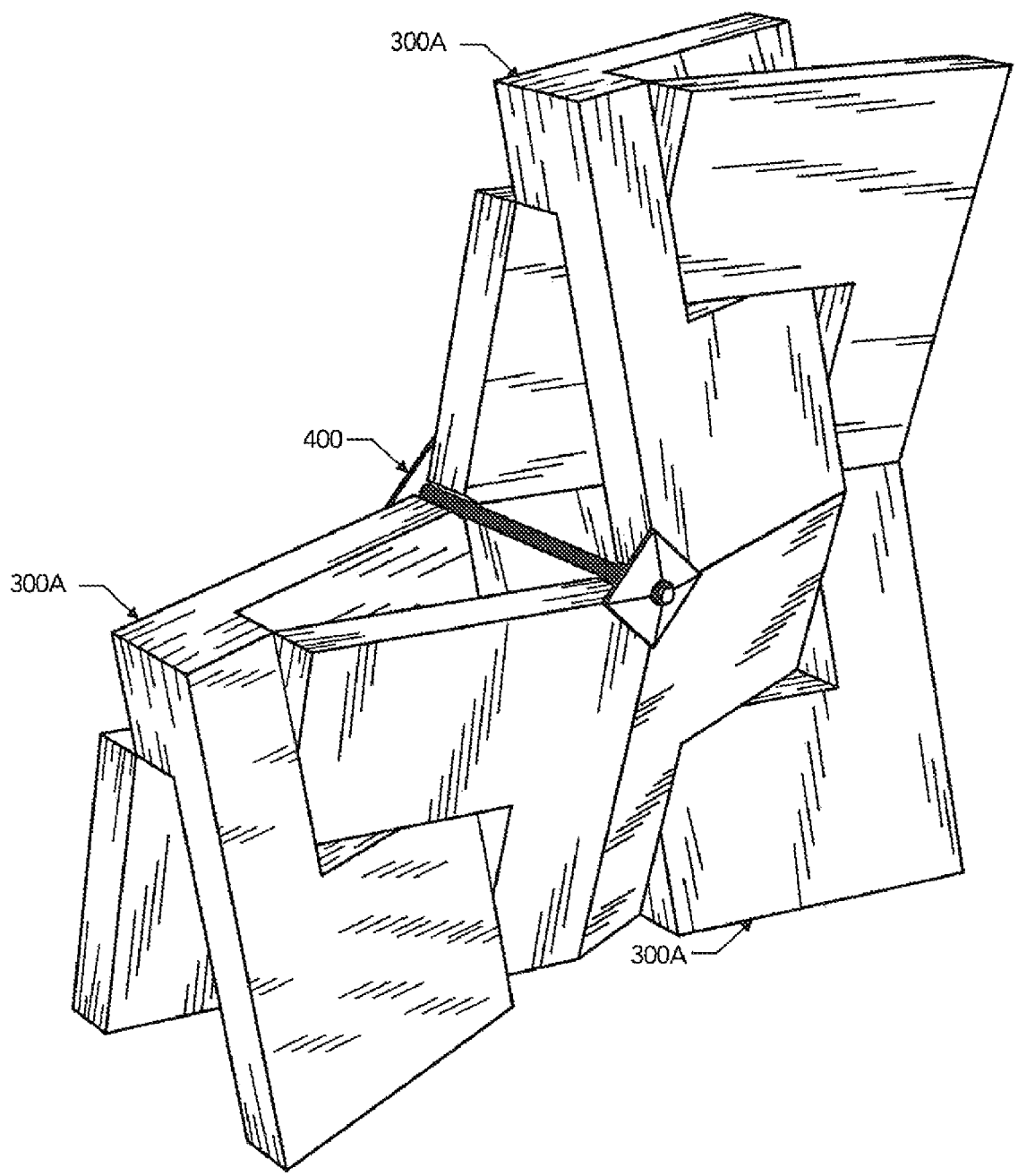
FIG. 5A shows blocks similar to the one shown in FIG. 3d in a stacked configuration and a connector strut similar to the one shown in FIGS. 4A-4C in place.

So far the embodiments of the invention described through FIGS. 1A-3D have been limited to a single building block unit, but it should be appreciated that several units similar to that of 300 can be used for various purposes and in many different configurations. In one embodiment of the invention, several blocks can be arranged along a line and other blocks can be stacked on top to form a wall. as shown in FIG. 5A. Although not necessary for the construction of a wall, a connector strut may be needed to attach walls of larger size and mass. This connector strut is described in FIGS. 4A-4D. FIG. 4A shows a side view of a connector strut 400, which is comprised of a rod 114, and two plates 115 and 116. FIGS. 4A and 4B show a front view of the two plates 115 and 116 respectively. The two plates are identical aside from a hole in the center of 115 to allow for the rod 114 to pass through and receive a tightening nut 117. Both plates are formed with four identical sides which come together at angles depending on the size and application of the invention. The angle between the plates is directly related to the size of the chamfers 107 in the building blocks. FIGS. 4C and 4D show the two plates joined together by a rod 114. The rod 114 can vary in length and thickness depending on the size and application of the invention, and is welded at one end to plate 116 and threaded and bolted at the other end at plate 115. The purpose of the anchors is to provide additional strength to the wall of blocks.

A plurality of blocks 300 may be stacked to make various structures such as highway acoustic barrier, architectural dividing walls, retaining walls, separation walls, temporary room dividers similar to a shoji panel, concrete formwork, table supports or decorative surfaces.

In the parent application Ser. No. 11/845,904 filed Aug. 28, 2007, a different L-shaped component is used. This earlier component is formed of two legs generally disposed perpendicularly to each other and having the same length and width, with the width much smaller then the length. As a result, the two components form elements that have a sizeable opening and when these elements are interlocked to form blocks that look more like frames, while the components of FIGS. 1A-1B result in blocks that have virtually no windows or other through openings.

In another embodiment of this invention, a window structure is formed of two identical components 500. FIGS. 6A and 6B show the front and back of such a basic component 500. The component 500 is generally L shaped with a first leg 118 and a second leg 119. Although not necessary in every instance, in a preferred embodiment suitable for most common applications these legs are positioned perpendicular to each other. Preferably, the two legs have the same width 120 and both legs 118 and 119 are of equal length. It should be noted, that although this configuration is preferable, there may exist scenarios where the lengths of leg 118 is different than the length of 119. Each leg 118 and 119 is cut with a chamfer angle on the inside edge at 124 which can range between 10 to 80 degrees, this angle being different for different sizes and applications, as discussed below.

Referring to FIGS. 7A and 7B, two components 500A and 500B are joined to form a first element 600 as follows: starting with FIG. 7A, first component 500A is positioned as shown, and the second component 500B is rotated in a position that is offset by 180° from component 500A and the chamfers face away from each other. The two components are then superimposed at the two opposite ends 121 and 122 and joined to form an element 600. The components 500A and 500B can be joined by any well know means. For example, an adhesive may be applied between them. Alternatively, the two components may be screwed, nailed or welded together. It should be appreciated that because of the shapes of the legs, the overlaps between the legs of the opposed components is in the shape of a square.

Figure 8A:
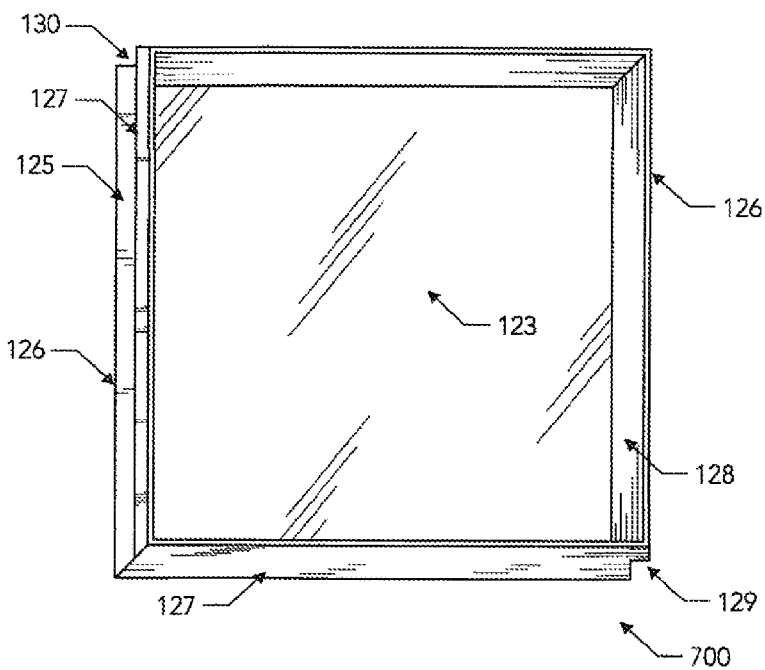
FIGS. 8A and 8B show a front and isometric view of an inner component of a window holding a piece of glass and constructed in accordance with this invention.
Figure 8B:
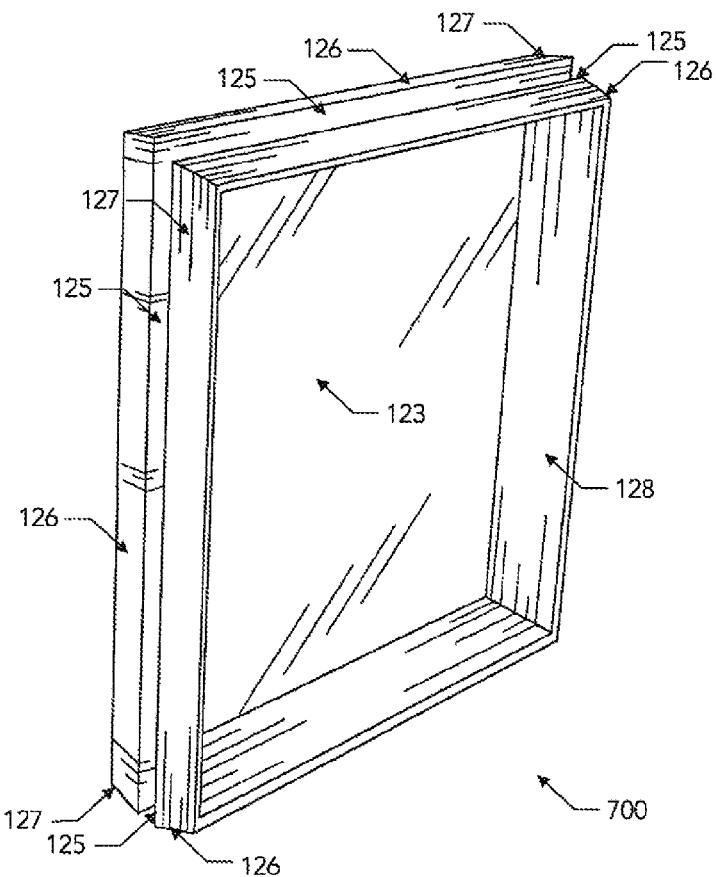

Referring now to FIGS. 8A and 8B a second element 700 is provided within and interlocked with the first element 600. Importantly, second element 700 contains a flat glass sheet 123. The sheet 123 is attached to the second element by conventional means, including a groove formed in the legs, by using a glazing material, etc.

Each edge of element 700 consists of a three faced exterior surface 124, 125 and 126, and a one faced interior surface 128. Face 125 is oriented parallel to the orientation of the glass, and acts as stop and seal between it and the flat faces in components 500A and 500B of element 600. Face 126 is oriented perpendicular to the orientation of the glass, and face 127 is at an angle to match the chamfer of components 500A and 500B shown at 124. Referring to the interior face 128, this face is oriented to match the angle of 124, and is angled in a direction depending on which edge it is located. These edges are formed in such a way as to both overlap and provide open regions as shown at 129 and 130.

Figure 8C:
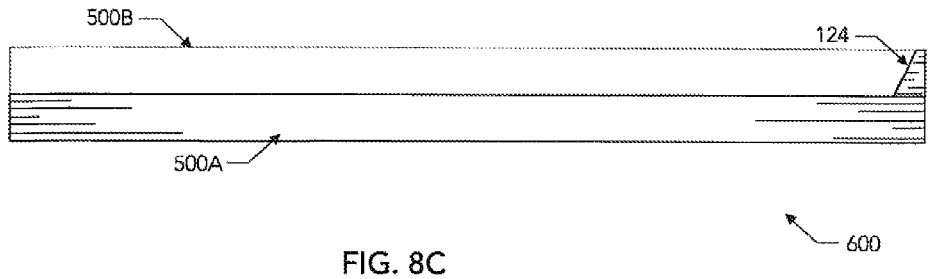
FIGS. 8C and 8D show a top view of both the outer and inner components of the window respectively.
Figure 8D:
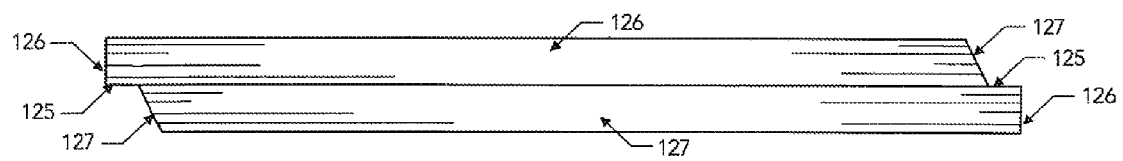
Figure 10:
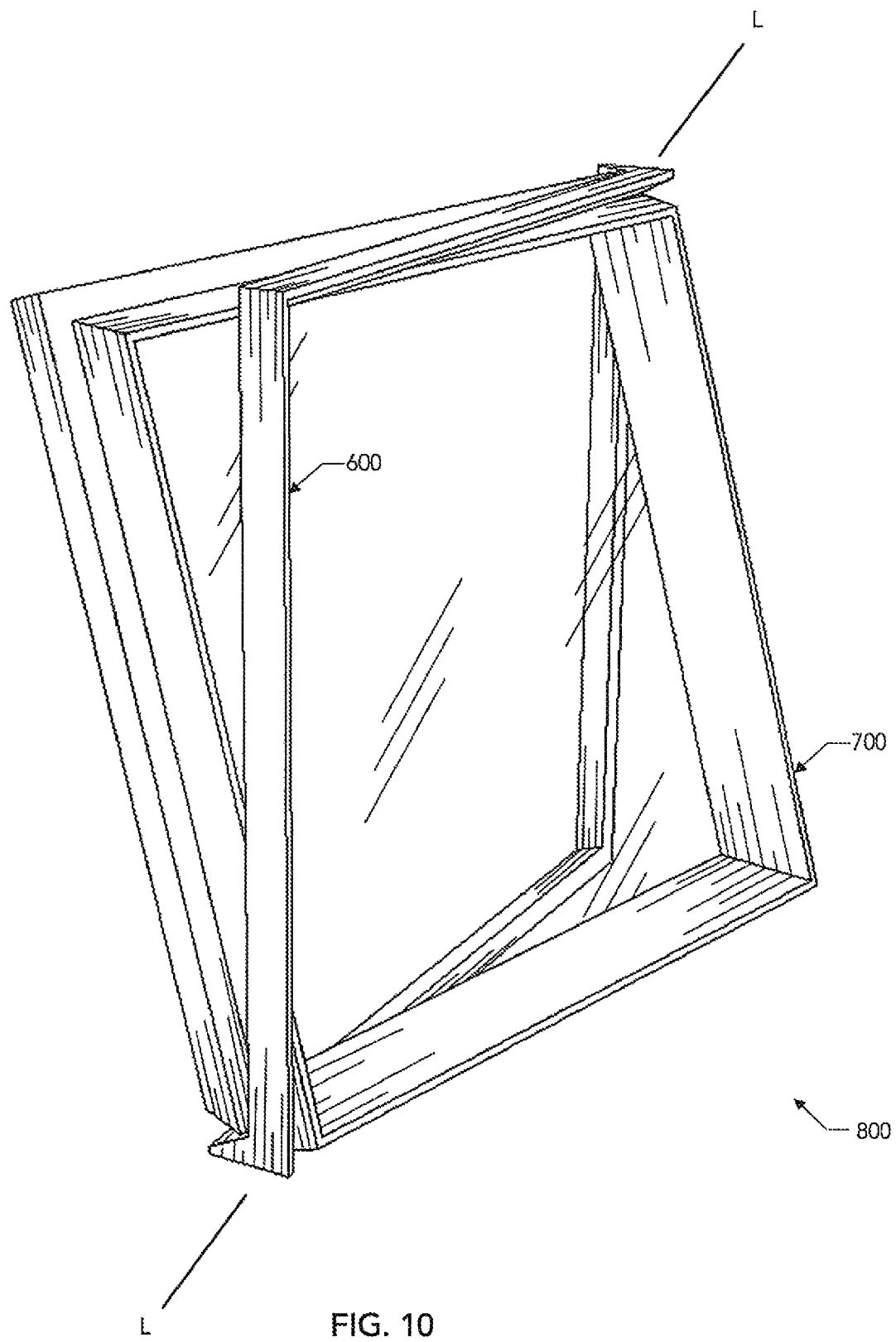
FIG. 10 shows an isometric view of a window constructed in accordance with this invention.
Figure 11A:
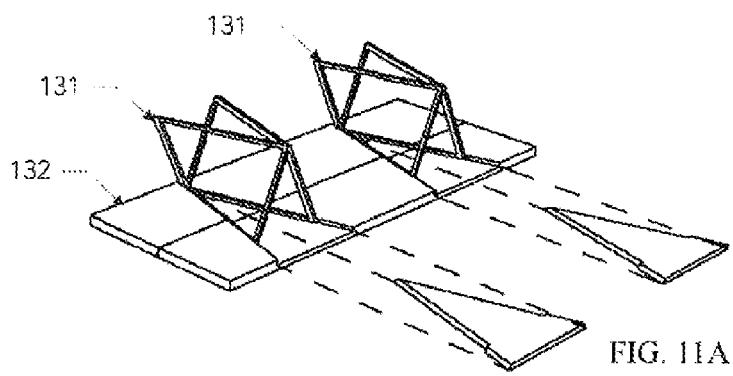
FIGS. 11A-11D shows a multi-leveled architectural structure, such as a building constructed using blocks similar to the window blocks of FIGS. 6-10.
Figure 11B:
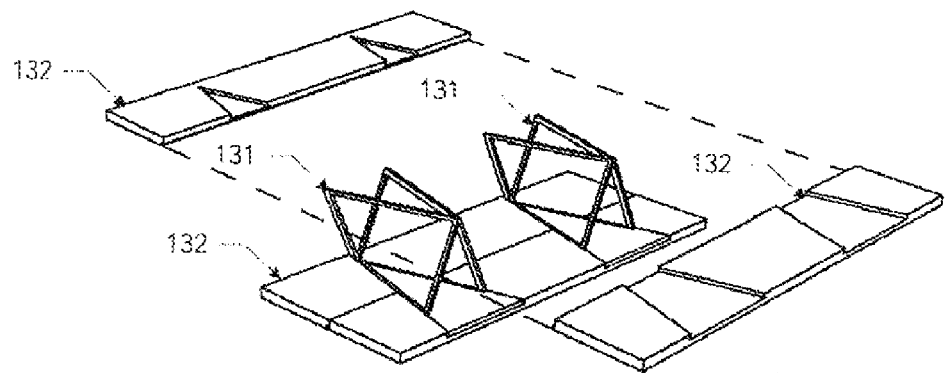
Figure 11C:
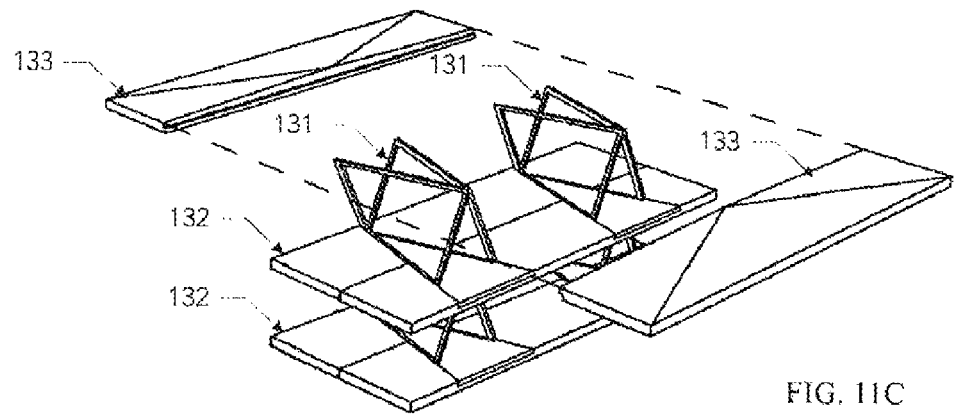
Figure 11D:
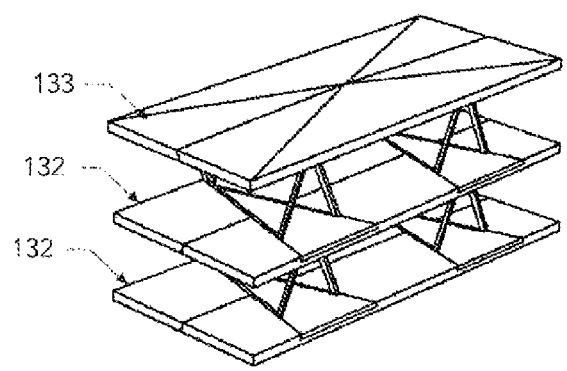

Referring to FIGS. 8C and 8D, it should be noted that the chamfer at 124 and 127 is identical on all edges, and can vary depending sizes and applications of the window. More specifically, the larger the chamfer cut into each edge, the greater the angle of opening which is possible between each component, as illustrated in FIG. 10. These chamfered surfaces act as stops and will resist any additional forces to pivot element 700 further.

Figure 9A:
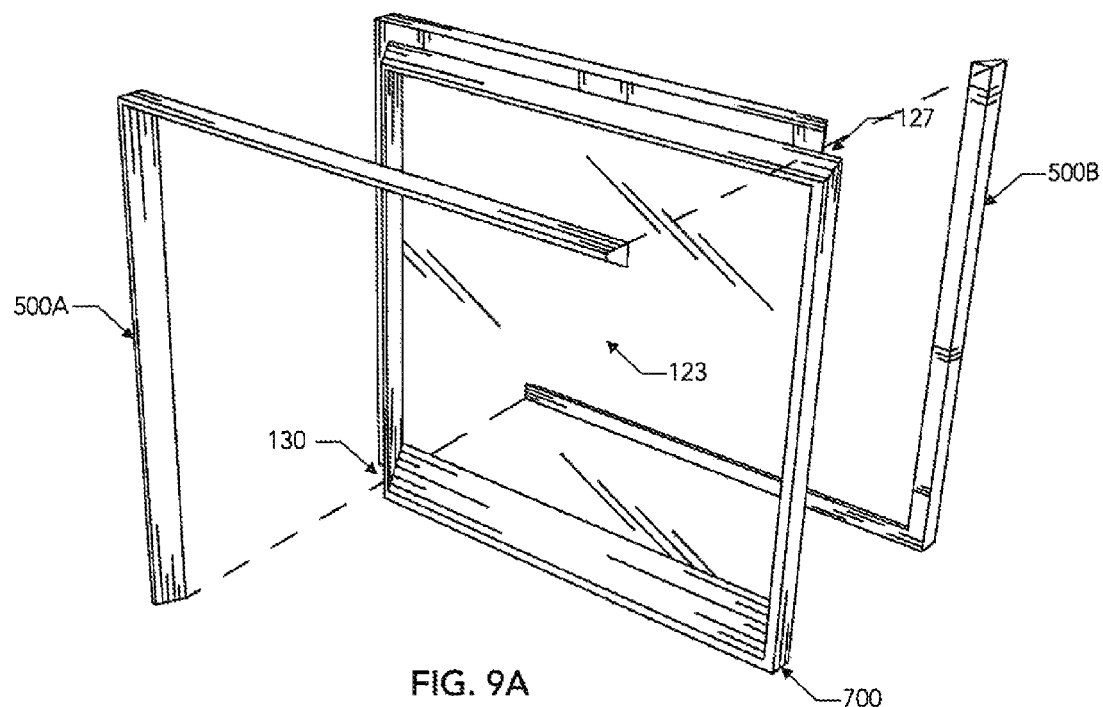
FIGS. 9A and 9B show the two elements similar to the ones described above being combined to form a window constructed in accordance with this invention.
Figure 9B:
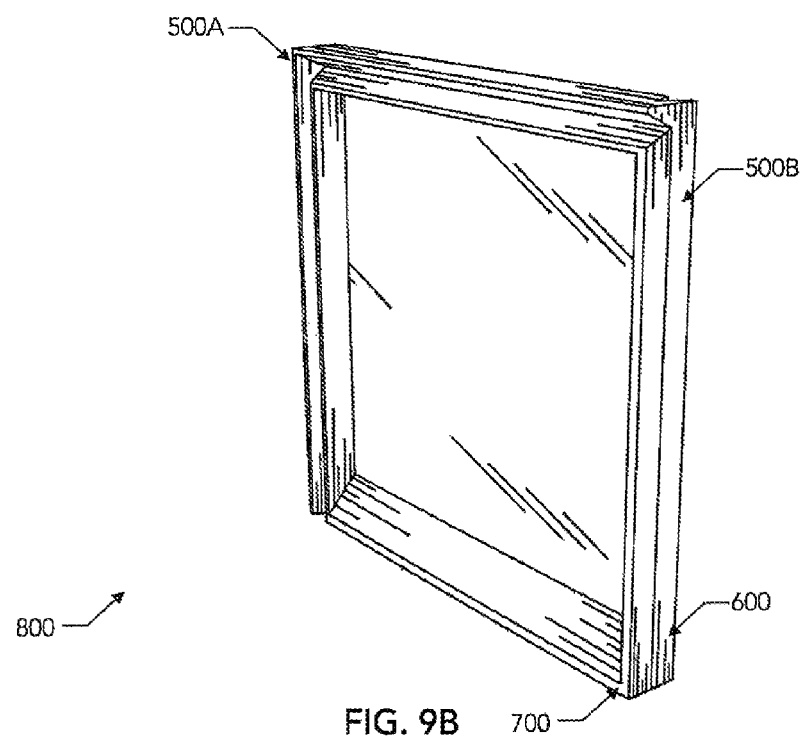

Referring now to FIGS. 9A and 9B, the element 600 is assembled from its components 500A and 500B so that it is interlocked with element 700. More specifically, the component 500A and 500B are positioned so that their overlapping regions can be connected through the open regions 129 and 130 in element 700. It should be apparent that the two elements 500A and 500B are interlocked because the common regions of element 600 are disposed in the open regions of 700 and together form the element 800. It should be appreciated that the thickness of elements 700, and the resulting element 800 is equal to double the thickness of the components 500A, 500B.

Since the two elements 600 and 700 are not mechanically fixed to each other, they can pivot with respect to each other along diagonal axis L-L as shown in FIG. 10. Importantly, the movement of the elements is limited by the chamfered surfaces 127 and 124. In other words, the elements 700 can be pivoted from the superimposed or closed configuration shown in FIG. 9B toward the open configuration shown in FIG. 10 until the chamfered surfaces of the components come into contact with each other. The element 700 cannot be pivoted any further because the chamfered surfaces 124 and 127 act as stops and will resist any additional forces to pivot further. Conversely, once the flat surfaces of element 600 come in contact with the surfaces at 125 in element 700 the element 800 will not be allowed to pivot any further and will be considered closed and sealed, as shown in FIG. 9B. The structure shown in FIGS. 6-11 is particularly advantageous because it can be made easily and inexpensively without the need for complicated mechanisms that are used in other kind of opening windows, found in conventional building, while in the present invention the two elements naturally pivot with respect to each other. Moreover, the resulting window has a unique esthetically pleasing appearance.

FIGS. 11A-D show an architectural structure constructed in accordance with the invention. The architectural structure uses elements similar to those described in previous embodiments of the invention, but constructed with much larger dimensions. FIG. 11 shows identical elements 130 sitting atop a floor structure 131, and used to support floor plates 132 and a roof plate 133. The elements combine to form a two story structure 900. The floor plates are made of cement slabs or other conventional construction material. Depending on construction considerations, the floor plates may be made of one, two or more sections.

Attached to each of the floor plates are two or more elements 131. The elements 131 are sized and shaped so that they support the floors above and have a height that defines the vertical spacing between the floor plates 132. Each of the elements 131 are made of steel, reinforced concrete or other material. They may have the more closed configuration similar to the structures in FIGS. 1A-5A (i.e., with virtually no open space left between the components, or, preferably, they can have a more open structure similar to the structures shown in FIGS. 6A-10.

The elements 131 can be attached to the floors and the ceilings by bolts and other conventional means. Alternatively, or in addition, grooves or slots may be formed in the floors (and ceilings) to accommodate and hold the elements 131. In one embodiment of the invention, the floors are prefabricated with appropriate grooves. In another embodiment, the floors are made are prefabricated with triangular depressions 135. Once the floors are assembled and the elements 131 are placed in these depressions 135, triangular inserts 137 having the appropriate sizes and shapes are inserted into the depressions thereby trapping the elements 131 in place. Similar grooves or depressions may be provided in the bottom surfaces of the floors forming ceilings. The purpose of the grooves and depressions 135 is to stop the horizontal members of the elements 131 from separating under load.

In this manner the elements 131 can be used to construct a completely new type of building having a very revolutionary structure that may be cheaper to built and is certainly esthetically attractive. Conventional interior and exterior walls, doors, windows and other structural elements may be added as needed.

Figure 12:
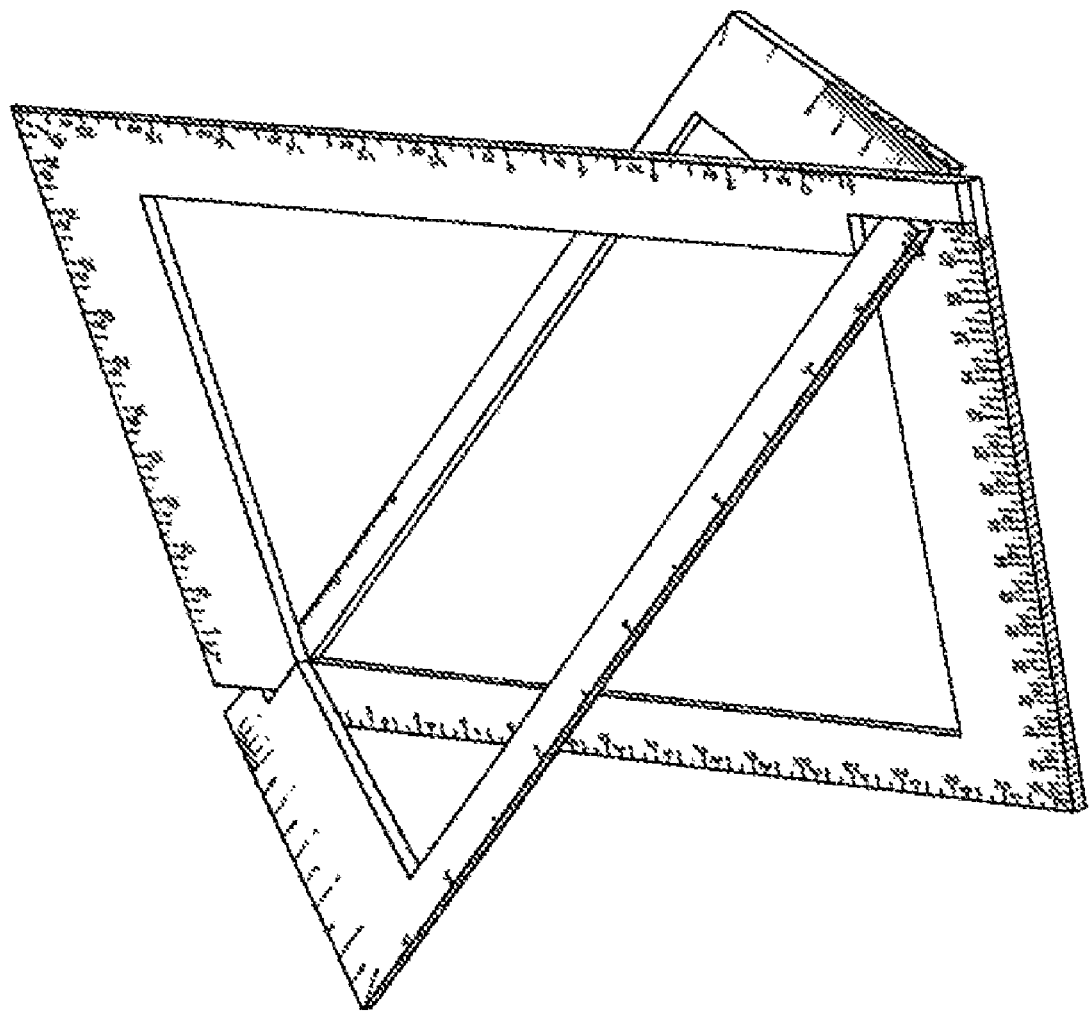
FIG. 12 shows an isometric view of an architect or engineer's scale ruler formed in accordance with this invention

FIG. 12 shows an architects or engineer's ruler made from long thin components similar to the ones used for the window frame but in this case they can be flat, while for the window frame, the L-shaped components can have a triangular, square, rectangular cross section to provide more strength thereto.

Numerous modifications can be made to this invention without departing from its scope as defined in the appended claims.

I claim:

1. An architectural structure comprising:
   a floor member;
   a roof member spaced above said floor member; and
   a plurality of support structures supporting said roof member on said floor member, each said support structure including:
   a first and a second element, each of said elements generally having the shape of a parallelogram with a central opening, a diagonal axis and four corners including a first corner and a second corner opposed to said first corner along said diagonal axis, internal surfaces chamfered at a first angle and disposed at said first and second corners;
   each element passing through the central opening of the other element;
   wherein, said chamfered internal surfaces of each of the first elements are abutting respective chamfered surfaces of the second elements at said opposite corners and acting as stops to prevent the relative movement of one of said elements with respect to the other.

2. The architectural structure of claim 1 each support structure has horizontal segments and said floor and roof members have grooves receiving said horizontal segments.

3. The architectural structure of claim 1 wherein said support structures have horizontal segments and at least said floor member is formed with cutouts receiving said horizontal segments and inserts disposed in said cutouts and arranged to trap said horizontal segments.

4. The architectural structure of claim 1 wherein said architectural structure has several levels further comprising intermediate members having a lower surface acting as a ceiling for a previous floor member and a top surface acting as a floor for the next member.

5. The architectural structure of claim 1 wherein said first and second elements of each support structure are substantially identical.

6. The architectural structure of claim 1 wherein said elements are oriented with said first corners are disposed adjacent to said roof member and said second corners are disposed adjacent to said floor member.

7. The architectural structure of claim 1 wherein each element is composed of two identical components, each component having an L-shape.

8. The architectural structure of claim 7 wherein each component has a major component section and a minor component section with the major component of each section being attached to the minor component of the other section.

9. The architectural structure of claim 8 wherein each component is formed with six lateral edges, said edges having modular dimensions, with one of the edges being the smallest edge and the other edges having a respective length that is an integral multiple of the other edges.

10. The architectural structure of claim 9 wherein one of said edges has a length x, three of the edges have a length 2x, one edge has a length 3X and one edge has a length 4x.

11. The architectural structure of claim 1 wherein said chamfered surfaces are formed at an angle in the range of 75° to 90°.

12. The architectural structure of claim 1 wherein said elements are rectangular.

13. The architectural structure of claim 1 wherein said elements are square.

14. An architectural structure comprising:
a floor member;
a roof member spaced above said floor member; and
a plurality of support structures supporting said roof member on said floor member, each said support structure including:
a first and a second element, each of said elements generally having the shape of a parallelogram with a central opening, a diagonal axis and four corners including a first corner and a second corner opposed to said first corner along said diagonal axis, internal surfaces chamfered at a first angle and disposed at said first and second corners;
each element passing through the central opening of the other element;
wherein said chamfered internal surfaces of each of the first elements are abutting respective chamfered surfaces of the second elements at said opposite corners and acting as stops to prevent the relative movement of one of said elements with respect to the other; and
wherein each support structure has horizontal segments and said floor and roof members have grooves receiving said horizontal segments.

15. An architectural structure comprising:
a floor member;
a roof member spaced above said floor member; and
a plurality of support structures supporting said roof member on said floor member, each said support structure including:
a first and a second element, each of said elements generally having the shape of a parallelogram with a central opening, a diagonal axis and four corners including a first corner and a second corner opposed to said first corner along said diagonal axis, internal surfaces chamfered at a first angle and disposed at said first and second corners;
each element passing through the central opening of the other element;
wherein said chamfered internal surfaces of each of the first elements are abutting respective chamfered surfaces of the second elements at said opposite corners and acting as stops to prevent the relative movement of one of said elements with respect to the other; and
wherein said support structures have horizontal segments and at least said floor member is formed with cutouts receiving said horizontal segments and inserts disposed in said cutouts and arranged to trap said horizontal segments.

* * * * *